United States Patent
Sekiya et al.

(10) Patent No.: US 6,349,389 B1
(45) Date of Patent: *Feb. 19, 2002

(54) COMMUNICATION CONTROL SYSTEM AND APPARATUS

(75) Inventors: Toshiyuki Sekiya; Takashi Soya, both of Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,354

(22) Filed: Apr. 18, 2000

Related U.S. Application Data

(62) Division of application No. 08/959,876, filed on Oct. 29, 1997, now Pat. No. 6,069,926.

(30) Foreign Application Priority Data

Oct. 30, 1996 (JP) ............................................. 8-303490

(51) Int. Cl.[7] ................................................. G06F 1/04
(52) U.S. Cl. ..................................... 713/600; 713/400
(58) Field of Search ................................ 713/400, 600; 709/400; 375/356, 357

(56) References Cited

U.S. PATENT DOCUMENTS

| | | | |
|---|---|---|---|
| 4,573,083 A | | 2/1986 | Shimizu ..................... 358/407 |
| 4,817,177 A | | 3/1989 | Shimizu ..................... 382/276 |
| 5,199,107 A | | 3/1993 | Ozawa |
| 5,712,585 A | * | 1/1998 | Jeong ......................... 327/293 |
| 5,754,835 A | * | 5/1998 | Lin et al. .................... 713/401 |
| 5,895,140 A | | 4/1999 | Koh et al. .................... 399/77 |

* cited by examiner

Primary Examiner—Dennis M. Butler
(74) Attorney, Agent, or Firm—Fitzpatrick, Cella, Harper & Scinto

(57) ABSTRACT

A communication control system includes a first communication control apparatus connected to one end portion of each of a clock signal line and a data signal line, and a second communication control apparatus connected to the other end portion of each of the clock signal line and the data signal line. In the communication system, the first communication control apparatus outputs a clock to the clock signal line and simultaneously outputs predetermined data to the data signal line, and then outputs a data string to be transmitted, the second communication control apparatus receives the clock from the clock signal line and simultaneously receives the predetermined data from the data signal line, and accordingly starts to receive the predetermined data string, the first communication control apparatus outputs the clock to the clock signal line independently of whether a communication abnormality is detected, and simultaneously outputs inverted data of the predetermined data to the data signal line to initialize the data reception device, and the second communication control apparatus receives the inverted data together with the clock, thereby canceling erroneous recognition of the start of the data string due to the noise mixture into the clock signal line.

75 Claims, 11 Drawing Sheets

COMMUNICATION CONTROL SYSTEM AND APPARATUS

This application is a divisional of Application Ser. No. 08/959,876, filed Oct. 29, 1997, now U.S. Pat. No. 6,069,926.

BACKGROUND OF THE INVENTION

1. Field of the Invention

The present invention relates to a communication control system and apparatus for performing communication via a clock signal line and a data signal line.

2. Related Background Art

In recent years, the number of output/drive devices such as a display device, a stepping motor, an electromagnetic clutch, and a solenoid or input/sensor devices such as an operation switch, a photointerruptor, and a mechanical binary switch has tended to increase to improve the performance of an image forming apparatus such as a copying machine. Accordingly, the number of signal lines for transmitting control signals in such systems has increased. This results in serious problems including an increase in size and weight of bundled signal lines, degradation in assembly/decomposition properties and reliability, and an increase in cost.

To solve these problems, a serial communication system is proposed in which communication substations each addressed to a unique address are arranged at various points in the system. At least one serial data line and one serial communication synchronous clock line are extracted from a main controller for controlling the entire system. The communication substations are sequentially cascade-connected to perform serial data transmission/reception between a desired communication substation and the main controller.

Such a conventional serial communication system will be described with reference to FIG. 7 which is a block diagram showing the arrangement of the conventional serial communication system. Referring to FIG. 7, a main controller 1 controls the entire image forming apparatus. A host microcomputer (to be referred to as a host hereinafter) 2 serves as the control center of the main controller 1. A serial controller 3 is coupled to the host 2 via buses and serves as a master controller for serial communication. Communication substations (relay substations) 4 and 5 are set at various points in the system. Serial communication substation ICs 6 and 7 are mounted in the communication substations 4 and 5, respectively.

In this example, one serial communication substation IC 6 is an input IC exclusively used for reception, i.e., the input IC fetches binary data from various input devices such as a photointerruptor (sensor) and transfers the data to the serial controller 3 of the host 2. The other serial communication substation IC 7 is an output IC exclusively used to output data, i.e., the output IC receives data from the serial controller 3 of the host 2 and outputs the binary data to various drive devices such as a clutch. In this example, one serial communication substation IC 6 is addressed to address 0, and the other serial communication station IC 7 is addressed to address 1. Each 8-bit packet of communication data is made to correspond to an input port or an output port.

This system also includes a +5V power supply 8 for logic circuits, a data line (DATA) 9 for serial communication, a synchronous clock line (CLK) 10, a ground line (GND) 11, a +24V power supply 12 for drive devices, and a ground line (GND) 13. The main controller 1 and the communication substations 4 and 5 are cascade-connected via these lines. Particularly, in the system of this example, the data line 9 and the synchronous clock line 10 directly cascade-connect the serial controller 3 of the host 2 to the serial communication substation ICs 6 and 7 of the communication substations 4 and 5, and the serial communication substation IC at the intermediate position transmits the output from the preceding stage to the next stage via an internal buffer in real time, as shown in FIG. 7.

The operation of the serial communication system having the above arrangement will be described next with reference to a communication format shown in FIG. 8. To acquire the value of the photointerruptor connected to bit 0 of address 0, the host 2 issues a predetermined command to the serial controller 3 via an address bus (detailed description of the actual form of the command will be omitted). In response to the command, the serial controller 3 generates a desired number of synchronous clocks and transmits the synchronous clocks to the synchronous clock line 10. The serial controller 3 also executes the following serial data transmission/reception operation on the data line 9. Each substation fetches data at the rising of the synchronous clock. Upon detecting data of "L" low together with the clock during waiting for communication, the substation recognizes the start of a communication frame.

At the first clock, a start bit of "L" for declaring the start of a communication frame is output. In this example, the logical level in the noncommunication state of the data line 9 is "H" high. At the next clock, an R/W bit for defining a mode requested by the serial controller 3 for this frame, i.e., a data input mode or a data output mode, is transferred. In this example, when this bit is at "H", a read mode wherein the serial controller 3 receives data from the substation is set. When this bit is at "L", a write mode wherein the serial controller 3 outputs data is defined. Since the input IC is set at address 0, the serial controller 3 sets this bit at "H", as a matter of course.

In synchronism with the next four clocks, address 0 indicating the desired communication substation is serially transferred. All substations monitor the transferred data, and substation 0 whose self address coincides with the desired communication station address on the serial data is involved in subsequent communication. Substations having addresses different from the desired communication station address buffer the clocks and transmit them to the subsequent stages (in the direction away from the serial controller 3). In the read mode, the data line 9 buffers data from the subsequent stages and transmits it to the preceding stages. In the write mode, the data line 9 buffers data from the preceding stages and transmits it to the subsequent stages. Address 0, i.e., the designated station neglects (releases) data from the subsequent stage and serially transmits 8-bit data from the self input port in synchronism with the next eight clocks. The serial controller 3 receives the 8-bit serial data and recognizes the desired photointerruptor data at bit 0.

Almost the same procedure can be used when the host 2 drives a clutch connected to bit 0 of the output IC at address 1. The host 2 writes address 1 and issues the data and the data request command to the serial controller 3 via a bus (when data other than data at bit 0 of address 1 need not be changed, the same data as in the previous processing must be written in fact, and these data are transmitted to the serial controller 3).

The serial controller 3 transmits the necessary number of synchronous clocks to the clock line 10, as in the above processing. The serial controller 3 sequentially transmits a start bit, a write mode bit, address 1 as the 4-bit target address, and 8-bit write data. Only a substation at address 1 designated by the address bits fetches the 8-bit data on the data line 9 and outputs the data to the output port at the end of communication. In the read mode, data up to address bit A3 is output from the serial controller 3, and data bits D0 to D7 are output from the substation IC 6 or 7 to the serial controller 3. The serial controller 3 outputs clocks corresponding to one frame. The substation IC 6 or 7 outputs data bits D0 and D7 in synchronism with these clocks.

In serial communication following the above procedure, data of a plurality of bits can be transmitted/received to/from the communication substations arranged at various points in the system, so the number of signal lines for transmitting control information can be substantially reduced.

In the above-described prior art, however, the substation ICs only execute, as frame synchronization for serial data transmission/reception, simple sequence processing using synchronous clocks with reference to the start bit because of restrictions on cost whereby synchronization is maintained. Neither a variety of determination processing operations using a timer or a microcomputer for measuring frame time nor frame synchronization using a frame synchronous line different from the serial line is performed.

As shown in FIG. 9, when two noise components are mixed into the clock line in the transmission mode, and sequence processing of the substation advances by two steps from the original clock cycle, the frame ends before the end of the normal clock cycle in the substation. If transmission data bit D6 synchronizing with a subsequent normal clock is at "L" unexpectedly, the substation erroneously recognizes the bit data as the start of a new communication frame. Sequence processing progresses in synchronism with the remaining clocks, and even when the normal clock cycle is ended, processing continues to wait for next synchronous clocks to perform remaining sequence processing. When synchronous clocks of a new normal frame are generated, the remaining sequence processing starts, so the substation continues data reception in erroneous frame units.

As shown in FIG. 10, when six noise components are mixed, and accidentally, data bit D2 is at "L", data bit D3 is at "H", data bits D4 to D6 are at "L", and data bit D7 is at "H", the substation at address 1 is to output the data to the serial data line. Assume that the first data bit is at "L", and the serial controller 3 outputs data of level "H" to the serial data line because the serial controller 3 considers that communication is ended (FIG. 10). In this case, a potential difference of 25 V is generated on the serial data line, and the IC may be destroyed.

SUMMARY OF THE INVENTION

It is an object of the present invention to provide a communication control system and apparatus which solve the above problems.

It is another object of the present invention to provide a communication control system and apparatus capable of canceling erroneous recognition of the start of data in a second communication apparatus, which occurs when noise or the like is mixed into a clock signal line.

Other objects and features of the present invention will be apparent from the following description taken in conjunction with the accompanying drawings.

DETAILED DESCRIPTION OF THE PREFERRED EMBODIMENTS (First Embodiment)

Figure 7:
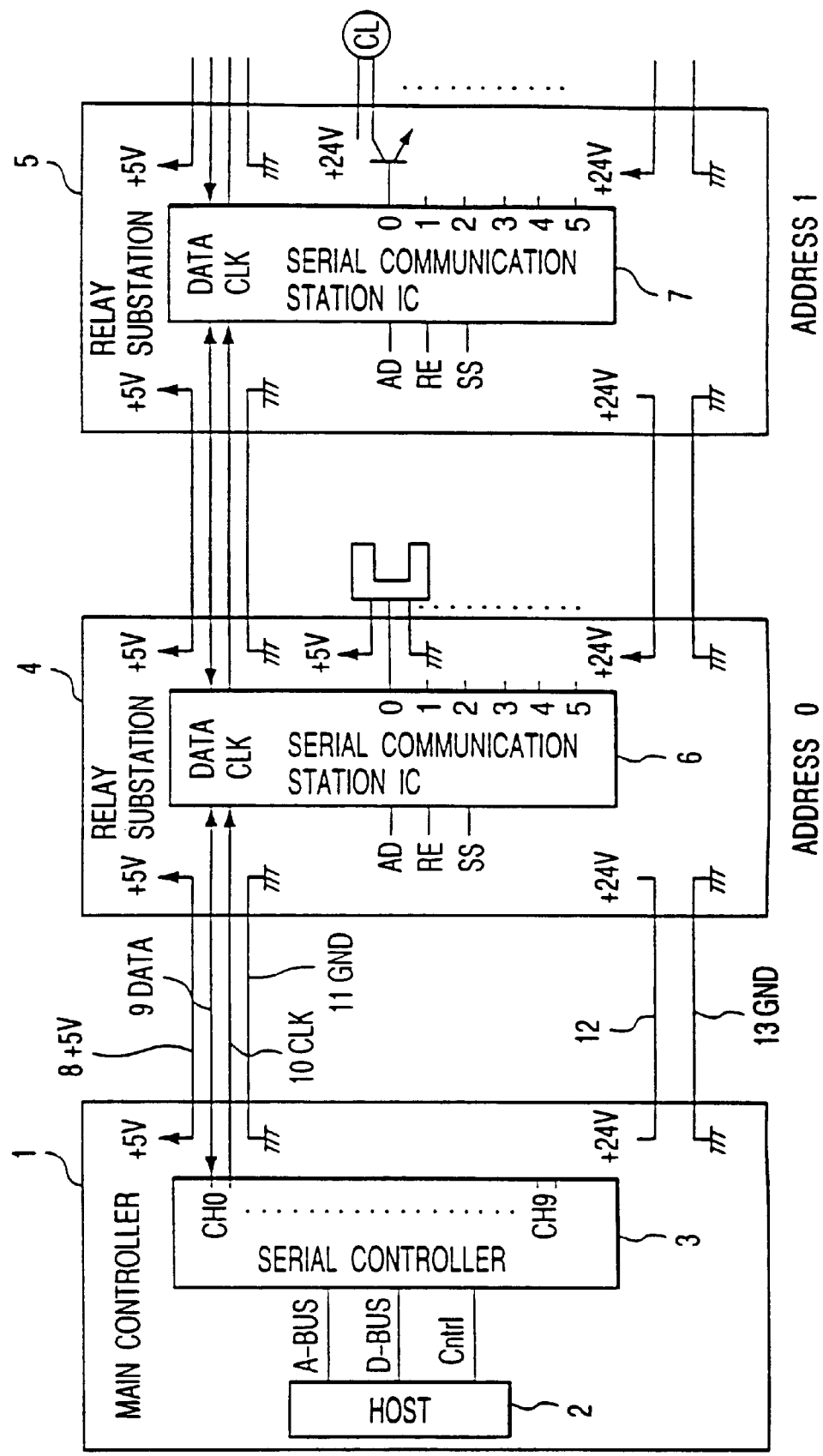
FIG. 7 is a block diagram showing the arrangement of a conventional serial communication system.
Figure 8:
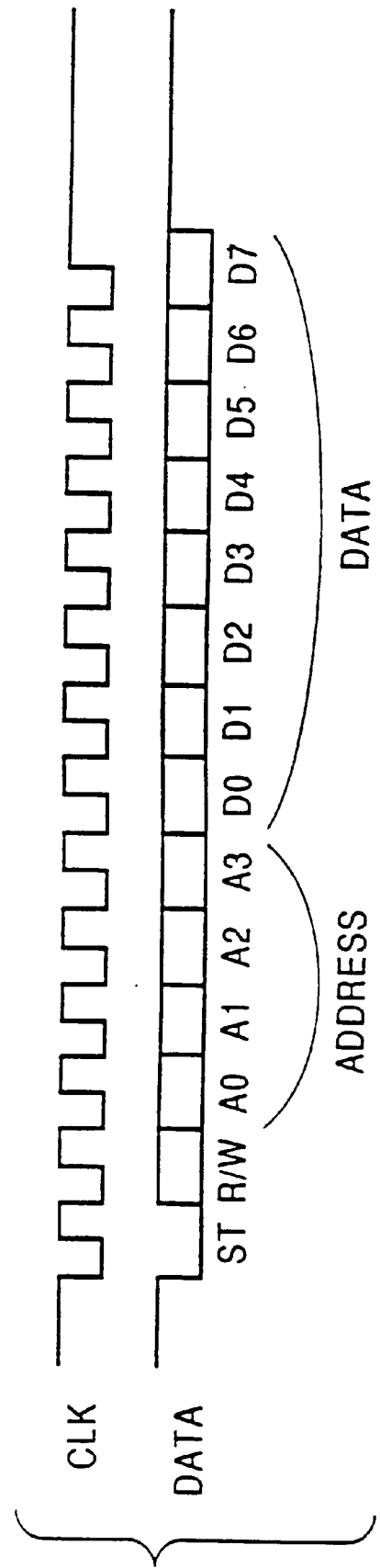
FIG. 8 is a view showing a format in the conventional serial communication system.

The first embodiment of the present invention will be described below with reference to FIGS. 1 and 2. The basic arrangement of the serial communication system of this embodiment is the same as that of the conventional system shown in FIGS. 7 and 8, and a detailed description of the common part will be omitted.

Figure 1:
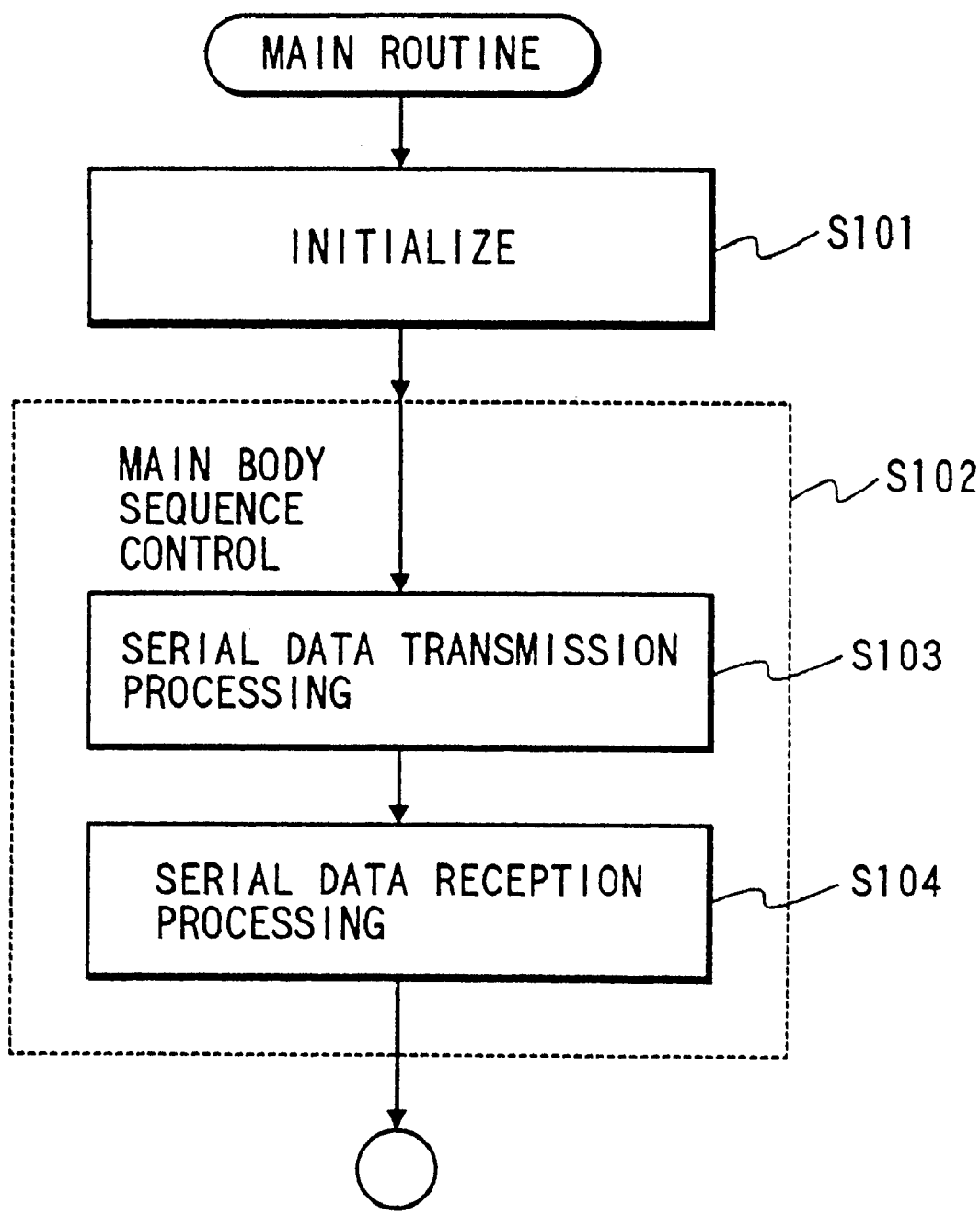
FIG. 1 is a flow chart showing the operation of a serial communication system according to the first embodiment of the present invention.
Figure 2:
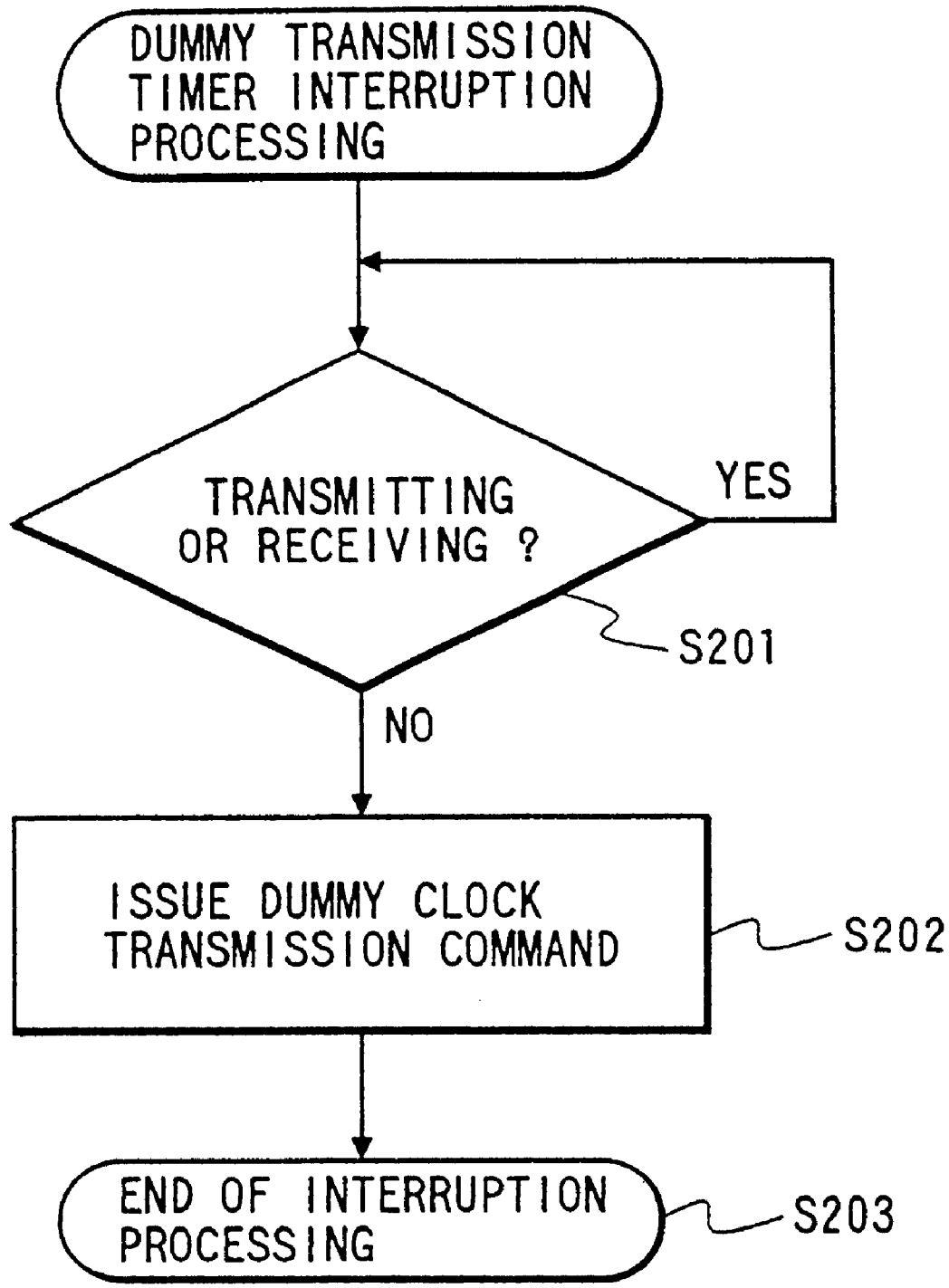
FIG. 2 is a flow chart showing the operation of the serial communication system according to the first embodiment.

FIGS. 1 and 2 are flow charts showing the operation of the serial communication system according to the first embodiment of the present invention. A host 2 in a main controller 1 loads a control program stored in a storage means to execute these processing operations.

Referring to FIG. 1, initialization is performed in step S101. In step S102, main body sequence control for the system is performed. Serial data transmission processing (step S103) and serial data reception processing (step S104) are performed. A procedure of the host 2 which occasionally reads/writes data from/in each substation in the system as needed while performing sequence control of the entire system is the same as in the above-described prior art.

The first embodiment is different from the prior art in that a dummy clock generation processing routine is executed every predetermined time by timer interruption processing shown in FIG. 2 independently of the main routine of the host 2 shown in FIG. 1. This routine is executed independently of detection of a communication error.

In FIG. 2, it is determined in step S201 whether data transmission or reception on the serial communication line is being performed, and this determination is made until data transmission or reception is ended. When data transmission or reception is ended, a dummy clock transmission command is issued in step S202. Accordingly, a serial controller 3 sets a data line 9 at "H" and transmits clocks in a number necessary for one normal frame. The interruption processing is ended in step S203.

Figure 6:
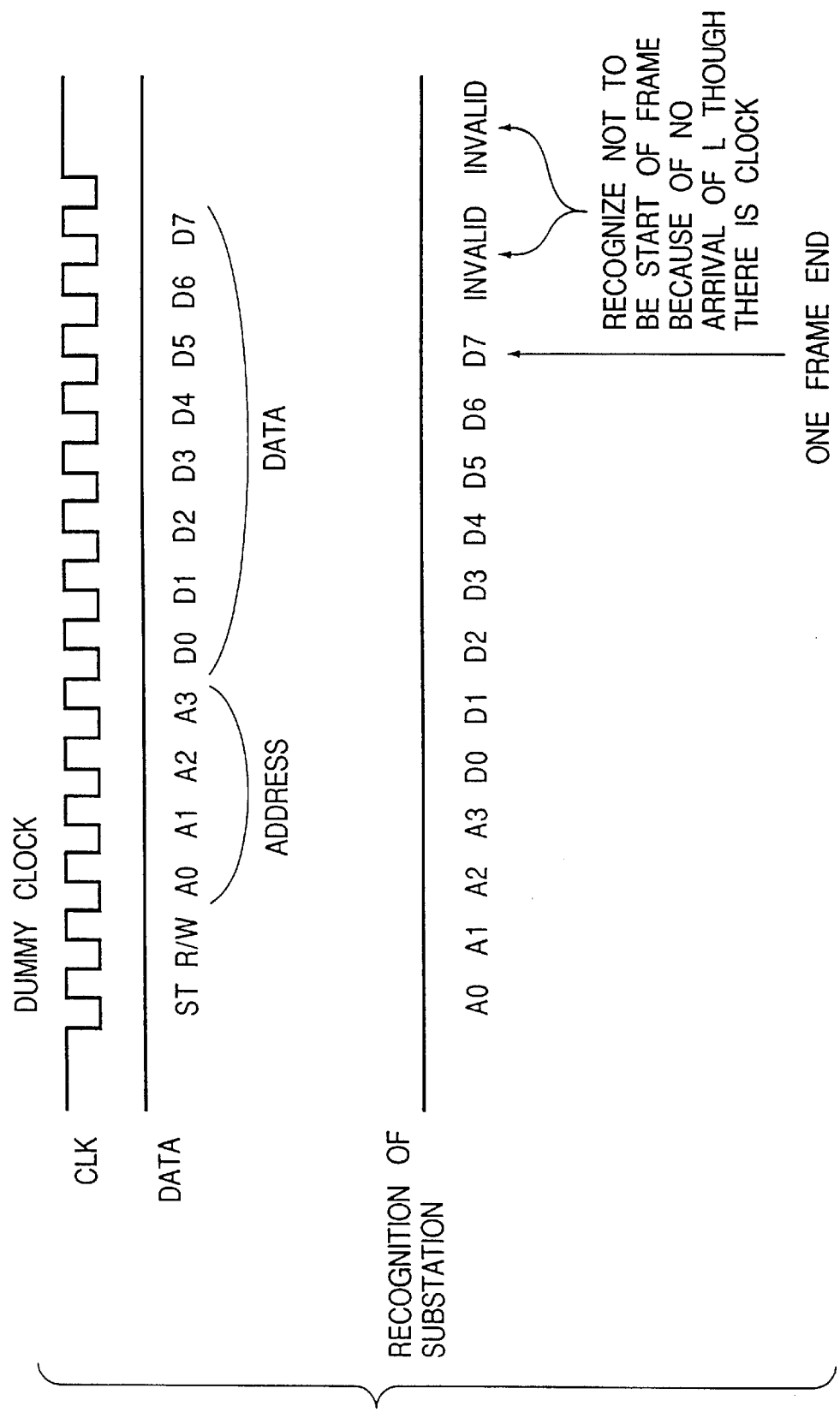
FIG. 6 is a view showing a dummy clock in the embodiments of the present invention.
Figure 9:
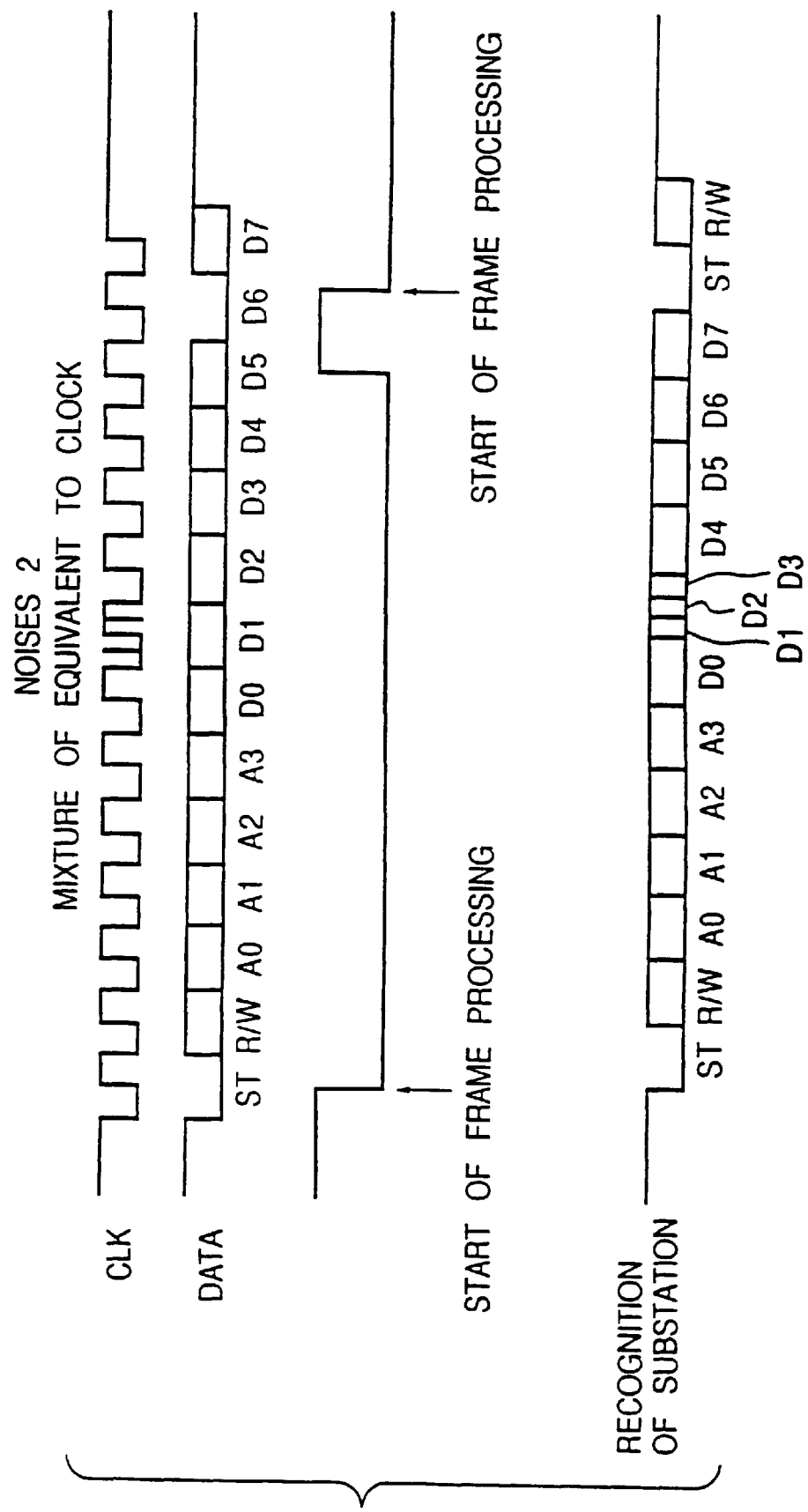
FIG. 9 is a view showing a frame shift in the conventional serial communication system.
Figure 10:
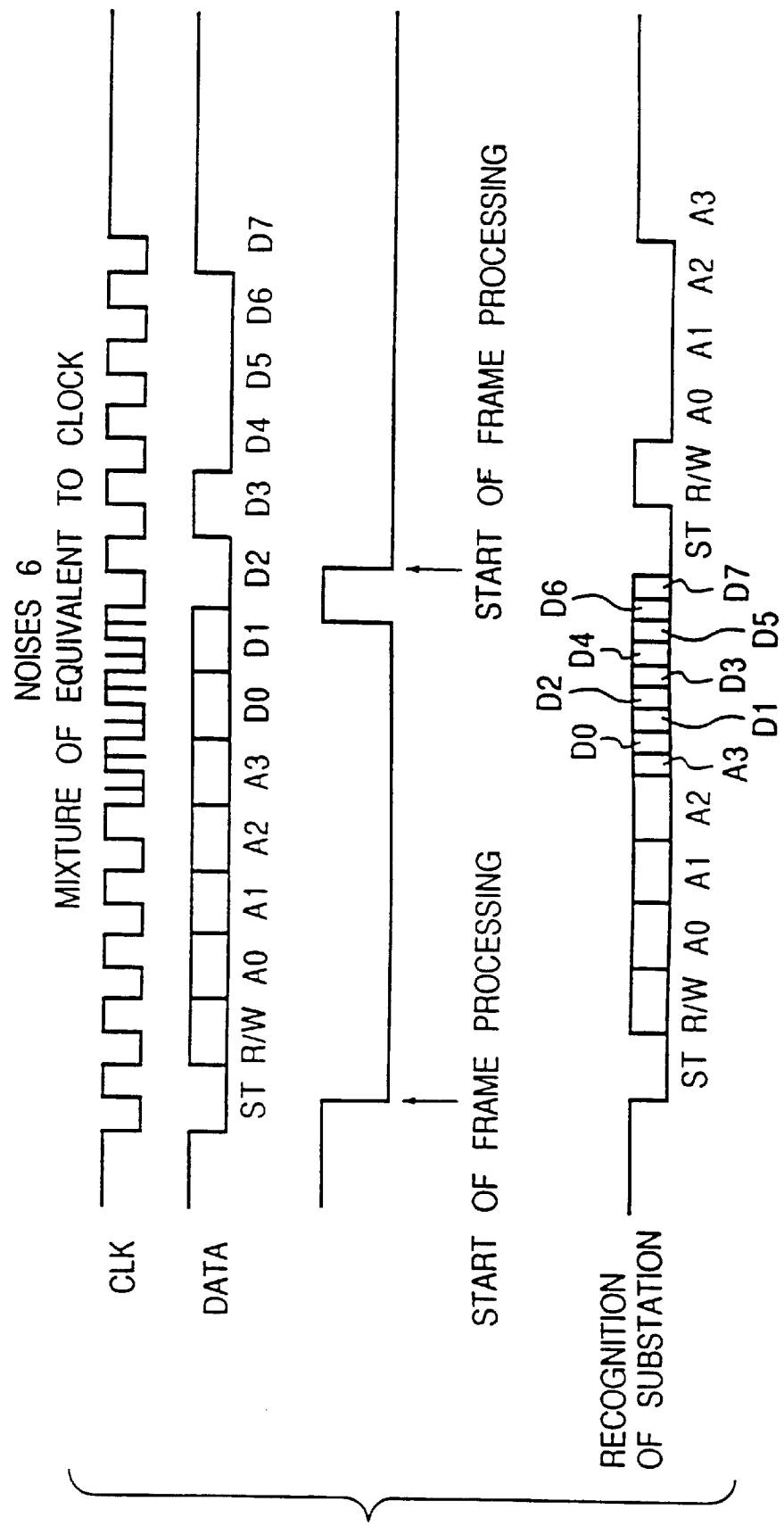
FIG. 10 is a view showing a frame shift in the conventional serial communication system.
Figure 11:
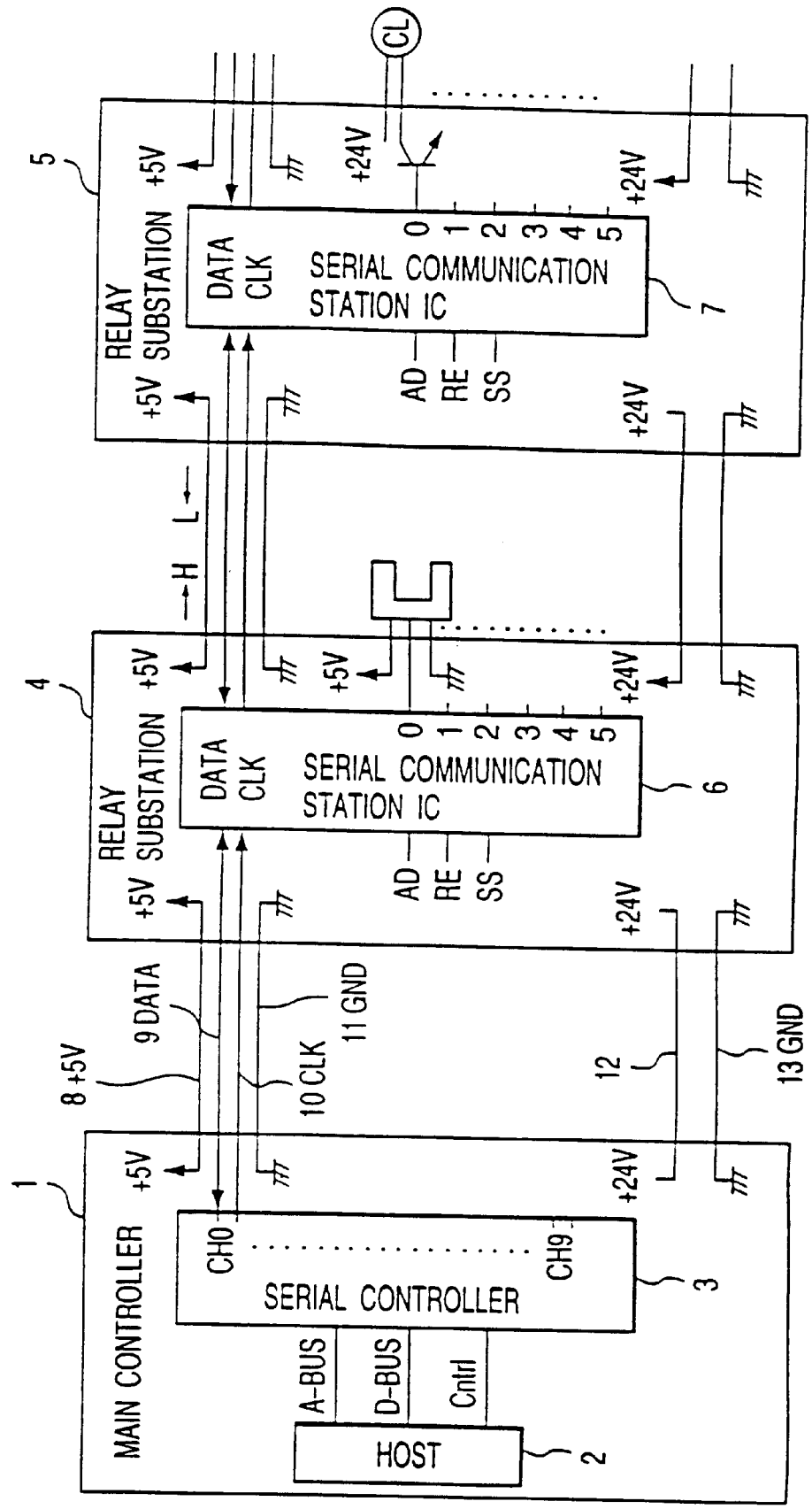
FIG. 11 is a block diagram showing the arrangement of the conventional serial communication system.

More specifically, in the dummy transmission interruption processing shown in FIG. 2, while dummy clocks for one frame are being output on the data transmission line 9 packet of, data whose start bit, R/W bit, address bits, and data bits are set at "H" is written in the serial controller 3 (as in the noncommunication state), as shown in FIG. 6, and a communication start command is issued. If a dummy clock generation command is defined in the serial controller 3, data need not be designated. If the serial communication line is already being used for data transmission/reception, processing waits until the frame is ended when the communication line becomes free, the serial controller 3 sets the data line 9 at H (noncommunication state), and transmits a number of clocks necessary for one frame. Even when a frame shift as shown in FIG. 9 has been generated in any one of substations before the dummy deck transmission operation, sequence processing of a single frame properly progresses to the final step in synchronism with the dummy clocks in the substation as shown in FIG. 6. Even when a frame is prematurely ended halfway, an erroneous operation of starting a new frame in synchronism with the remaining clocks can be prevented because the data line 9 is set in the noncommunication state (H) (no bit of "L" representing the start). In such a case, the number of dummy clocks to be output may be greater than the number corresponding to one frame.

In the above embodiment, the host 2 issues a command for generating dummy clocks to the serial controller 3 every predetermined time. However, the present invention is not limited to this. When the serial controller 3 can be equipped with an internal timer function, the serial controller 3 may independently generate dummy clocks on the basis of time management without waiting for the command from the host 2.

(Second Embodiment)

The second embodiment of the present invention will be described next with reference to FIGS. 3 to 5. The first embodiment exemplifies a system for transmitting dummy clocks every predetermined time on the basis of time management by a timer. In the second embodiment, before transmitting to the address of a substation connected to a high priority Load (i.e., a Load for which proper communication data transfer is much more critical than for other devices), dummy bits corresponding to one frame are transmitted, and then, normal communication is executed.

Figure 3:
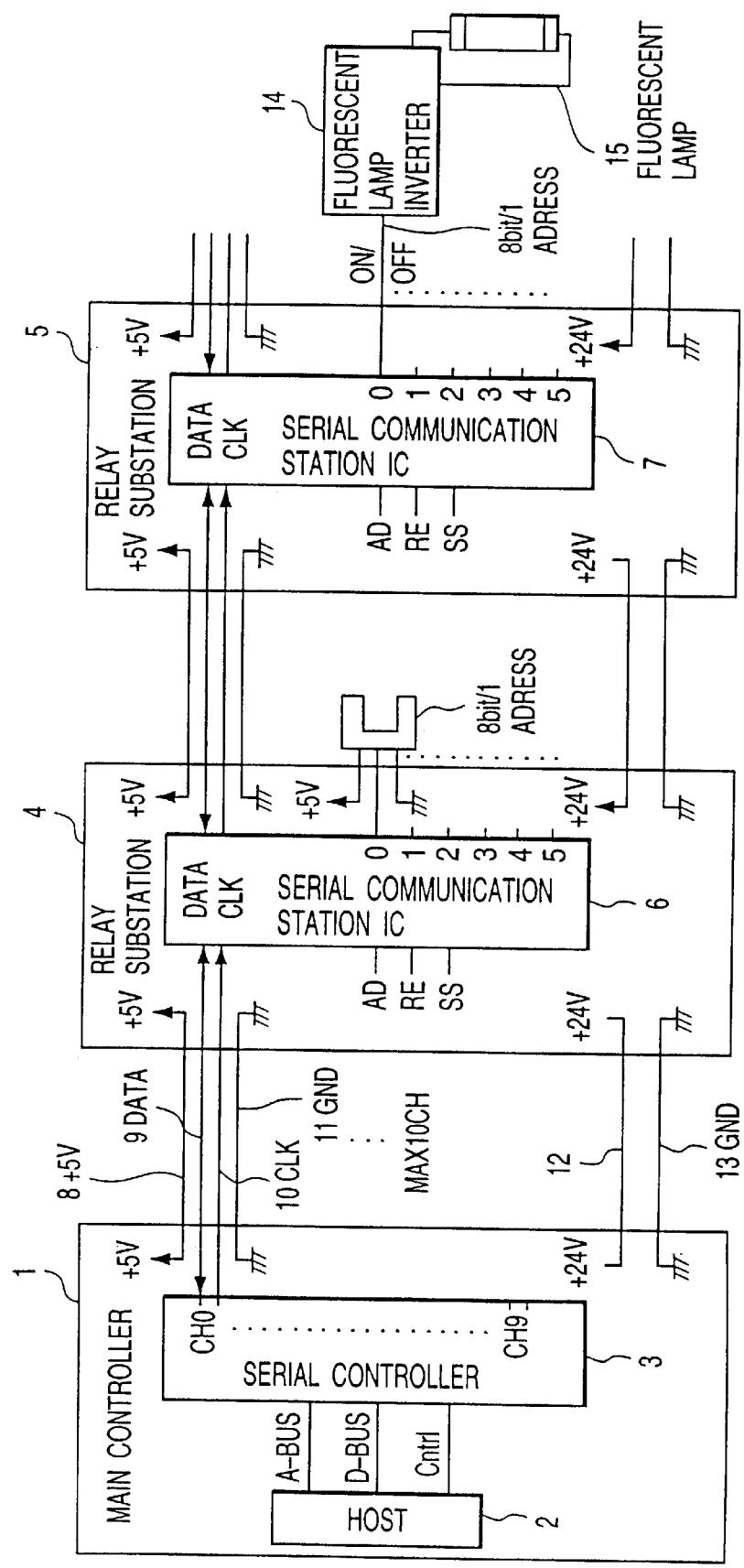
FIG. 3 is a block diagram showing the arrangement of a serial communication system according to the second embodiment of the present invention.

FIG. 3 is a block diagram showing the arrangement of a serial communication system according to the second embodiment of the present invention. The same reference numerals as in the prior art shown in FIG. 7 denote the same parts in FIG. 3. FIG. 3 is different from FIG. 7 in that the arrangement assumes an image forming apparatus using a fluorescent lamp as an exposure light source. When the ON timing of the fluorescent lamp delays due to a communication error, the leading edge of an image may be sometimes undesirably omitted, and this problem must be avoided. Referring to FIG. 3, the system includes a fluorescent lamp inverter 14 and a fluorescent lamp 15.

In FIG. 3, before transmission of an activation signal for the fluorescent lamp 15, dummy clocks corresponding to one frame as shown in FIG. 6 are unconditionally transmitted. Even if a frame shift has occured in some portion of the communication line, error cancelation processing is temporarily performed, and then actual data is transmitted at the next frame timing. For this reason, the probability of delay due to the communication error on the ON timing of the fluorescent lamp 15 can be lowered.

The operation of the serial communication system of the second embodiment will be described next with reference to flow charts shown in FIGS. 4 and 5.

Figure 4:
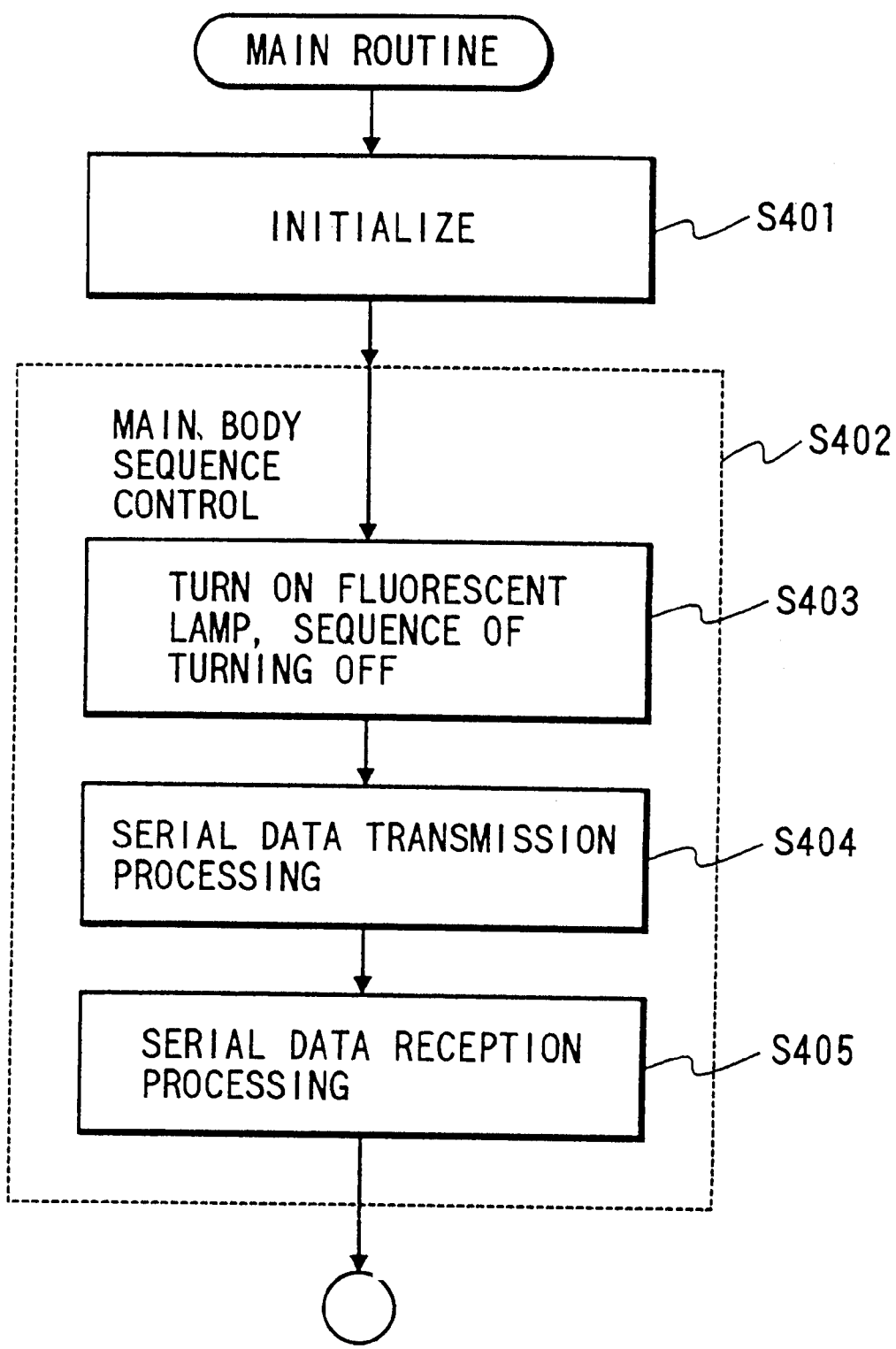
FIG. 4 is a flow chart showing the operation of the serial communication system according to the second embodiment.
Figure 5:
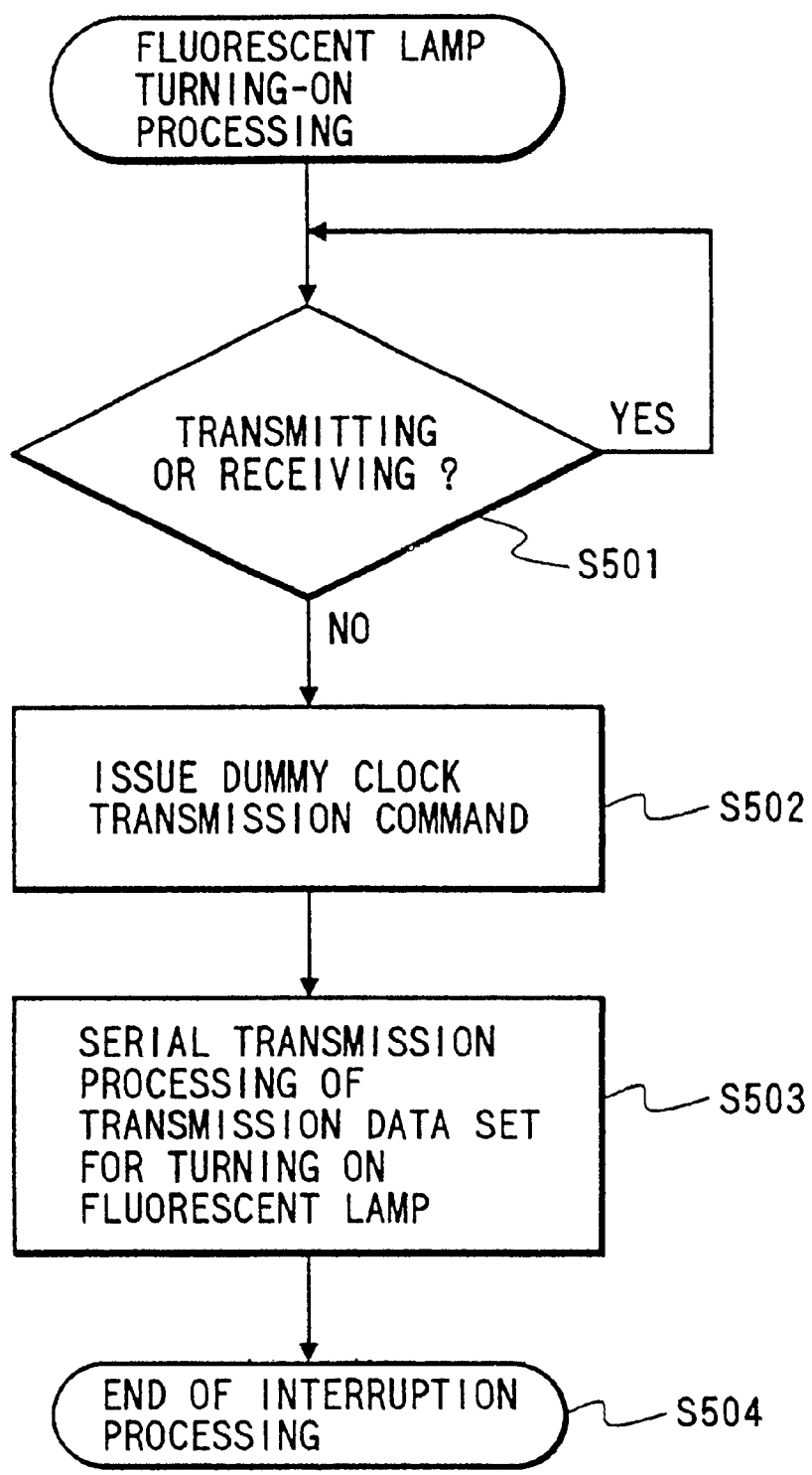
FIG. 5 is a flow chart showing the operation of the serial communication system according to the second embodiment.

FIGS. 4 and 5 are flow charts showing the operation of the serial communication system according to the second embodiment of the present invention. A host 2 in a main controller 1 loads a control program stored in a storage means to execute these processing operations.

Referring to FIG. 4, initialization is performed in step S401. In step S402, main body sequence control for the system is performed. The fluorescent lamp 15 is turned on and the sequence of turning off the fluorescent lamp 15 is performed (step S403), and serial data transmission processing (step S404) and serial data reception processing (step S405) are performed. A procedure of the host 2 which occasionally reads/writes data from/to each substation in the system as needed while performing sequence control of the entire system is the same as in the above-described prior art.

Communication processing for turning on the fluorescent lamp 15 is independently executed in the fluorescent lamp activation subroutine shown in FIG. 5, and normal communication processing in the main routine program shown in FIG. 4 is not used.

In FIG. 5, it is determined in step S501 whether data transmission or reception on the serial communication line is being performed, and this determination is made until data transmission or reception is ended. When data transmission or reception is ended, a dummy clock transmission command is issued in step S502. Accordingly, a serial controller 3 sets a data transmission line 9 at "H" and transmits a number of clocks necessary for one normal frame. In step S503, the fluorescent lamp turning-on transmission data is set, and serial transmission processing is performed. The interruption processing is ended in step S504.

In the above embodiment, communication processing for tuning on the fluorescent lamp 15 is independently executed in the fluorescent lamp tuning-on subroutine shown in FIG. 5, and normal communication processing in the main routine program shown in FIG. 4 is not used. However, the present invention is not limited to this. Depending on the processing capability (processing time) of the main routine program, dummy clock processing may be executed, and only transmission data setting for turning on the fluorescent lamp 15 may be performed in the fluorescent lamp turning-on processing subroutine. Actual data transmission may be performed in communication processing of the main routine program.

The present invention has as its object to transmit dummy synchronous clocks in a number corresponding to one frame (or in a larger number) in a communication frame before actual data is transmitted while holding the data transmission line 9 in the noncommunication state (H). As far as the program can realize this procedure, any arrangement and technique can be used.

(Third Embodiment)

A storage medium used for the serial communication system and apparatus of the present invention will be described next.

A storage medium stores a control program for controlling a serial communication system in which a plurality of communication stations each addressed to a unique address are sequentially cascade-connected on a communication synchronous clock line and at least one serial data transmission line, and when the address of a desired communication partner is transmitted from the communication subject to the serial transmission line, a communication station coinciding with this address recognizes it and subsequently executes an operation of transmitting/receiving desired data to/from the communication the storage medium also, may store at least the program code of a "control module".

The "control module" is a program module for performing control such that a predetermined communication subject transmits communication synchronous clocks in a number necessary to transmit one communication unit (frame) or a larger number to the communication synchronous clock transmission line at a predetermined interval or a predetermined timing outside the normal data communication operation between communication stations independently of detection of nondetection of a communication error while transmitting data on the serial data transmission line at the logic level of the noncommunication state.

What is claimed is:

1. An image forming apparatus which has a first communication control apparatus for controlling a driving unit of said image forming apparatus via a second communication control apparatus, comprising:

said first communication control apparatus for performing communication with said second communication control apparatus via a clock signal line and a data signal line, said second communication control apparatus receiving a clock from said clock signal line and simultaneously receiving predetermined data from said data signal line, and accordingly starting to receive a data string;

first data transmission means, provided to said first communication control apparatus, for outputting the clock to said clock signal line and simultaneously outputting the predetermined data to said data signal line, and then outputting the data string to be transmitted; and second data transmission means, provided to said first communication control apparatus, for outputting the clock to said clock signal line independently of whether a communication abnormality is detected, and simultaneously outputting inverted data of the predetermined data to said data signal line to initialize said second communication control apparatus, wherein said second data transmission means outputs the clock and the inverted data at a predetermined time interval.

2. An apparatus according to claim 1, wherein said second data transmission means outputs clocks at least corresponding to the data string to said clock signal line and simultaneously outputs the inverted data of the predetermined data at least corresponding to the data string to said data signal line.

3. An apparatus according to claim 1, wherein said second data transmission means outputs the clock and the inverted data every time before said first data transmission means output data.

4. An apparatus according to claim 1, wherein said second communication control apparatus outputs the data received to said driving unit of said image forming apparatus.

5. An apparatus according to claim 1 wherein said second communication control apparatus has third data transmission means for outputting data input from a sensor unit of said image forming apparatus to said data signal line in synchronism with the clock output from said first data transmission means to said clock signal line.

6. An apparatus according to claim 1, wherein said second communication control apparatus comprises a plurality of second communication control apparatuses, and said plurality of second communication control apparatuses are cascade-connected.

7. An apparatus according to claim 1, wherein said first and second data transmission means perform serial communication via said data signal line.

8. An image forming apparatus which has a first communication control apparatus for controlling a driving unit of said image forming apparatus via a second communication control apparatus, comprising:

said first communication control apparatus for performing communication with said second communication control apparatus via a clock signal line and a data signal line, said second combination control apparatus receiving a clock from said clock signal line and simultaneously receiving predetermined data from said data signal line, and accordingly starting to receive a data string;

first data transmission means, provided to said first communication control apparatus, for outputting the clock to said clock signal line and simultaneously outputting the predetermined data to said data signal line, and then outputting the data string to be transmitted; and second data transmission means, provided to said first communication control apparatus, for outputting the clock to said clock signal line independently of whether a communication abnormality is detected, and simultaneously outputted inverted data of the predetermined data to said data signal line to initialize said second communication control apparatus, wherein said second data transmission means outputs the clock and the inverted data when said first data transmission means does not output data.

9. An apparatus according to claim 8, wherein said second data transmission means outputs clocks at least corresponding to the data string to said clock signal line and simultaneously outputs the inverted data of the predetermined data at least corresponding to the data string to said data signal line.

10. An apparatus according to claim 8, wherein said second data transmission means outputs the clock and the inverted data every time before said first data transmission means outputs data.

11. An apparatus according to claim 8, wherein said second communication control apparatus outputs the data received to said driving unit of said image forming apparatus.

12. An apparatus according to claim 8, wherein said second communication control apparatus has third data transmission means for outputting data input from a sensor unit of said image forming apparatus to said data signal line in synchronism with the clock output from said first data transmission means to said clock signal line.

13. An apparatus according to claim 8, wherein said second communication control apparatus comprises a plurality of second communication control apparatuses, and said plurality of second communication control apparatuses are cascade-connected.

14. An apparatus according to claim 8, wherein said first and second data transmission means perform serial communication via said data signal line.

15. An image forming apparatus which has a first communication control apparatus for controlling a driving unit of said image forming apparatus via a second communication control apparatus, comprising:

said first communication control apparatus for performing communication with said second communication control apparatus via a clock signal line and a data signal line, said second communication control apparatus receiving a clock from said check signal line and simultaneously receiving predetermined data from said data signal line, and accordingly starting to receive a data string;

first data transmission means, provided to said first communication control apparatus, for outputting the clock to said clock signal line and simultaneously outputting the predetermined data to said data signal line, and then outputting the data string to be transmitted; and second data transmission means, provided to said first communication control apparatus, for outputting the clock to said clock signal line independently of whether a communication abnormality is detected, and simultaneously outputting inverted data of the predetermined data to said data signal line to initialize said second communication control apparatus, wherein said first communication control apparatus continuously outputs the inverted data to said data signal line when said first and second data transmission means do not output data.

16. An apparatus according to claim 15, wherein said second data transmission means outputs clocks at least corresponding to the data string to said clock signal line and simultaneously outputs the inverted data of the predetermined data at least corresponding to the data string to said data signal line.

17. An apparatus according to claim 15, wherein said second data transmission means outputs the clock and the inverted data every time before said first data transmission means output data.

18. An apparatus according to claim 15, wherein said second communication control apparatus outputs the data received to said driving unit of said image forming apparatus.

19. An apparatus according to claim 15, wherein said second communication control apparatus has third data transmission means for outputting data input from a sensor unit of said image forming apparatus to said data signal line in synchronism with the clock output from said first data transmission means to said clock signal line.

20. An apparatus according to claim 15, wherein said second communication control apparatus comprises a plurality of second communication control apparatuses, and said plurality of second communication control apparatuses are cascade-connected.

21. An apparatus according to claim 15, wherein said first and second data transmission means perform serial communication via said data signal line.

22. An image forming apparatus which has a second communication control apparatus for outputting data to a driving unit of said image forming apparatus, and a first communication control apparatus for communicating with said second communication control apparatus via a clock signal line and a data signal line, comprising:

first data transmission means, provided to said first communication control apparatus, for outputting a clock to said clock signal line and simultaneously outputting predetermined data to said data signal line, and then outputting a data string to be transmitted;

data reception means, provided to said second communication control apparatus, for receiving the clock from said clock signal line and simultaneously receiving the predetermined data from said data signal line, and accordingly starting to receive the data string; and second data transmission means, provided to said first communication control apparatus, for outputting the clock to said clock signal line independently of whether a communication abnormality is detected, and simultaneously outputting inverted data of the predetermined data to said data signal line to initialize said data reception means, wherein said second data transmission means outputs the clock and the inverted data at a predetermined time interval.

23. An apparatus according to claim 22, wherein said second data transmission means outputs clocks at least corresponding to the data string to said clock signal line and simultaneously outputs the inverted data of the predetermined data at least corresponding to the data string to said data signal line.

24. An apparatus according to claim 22, wherein said second data transmission means outputs the clock and the inverted data every time before said first data transmission means outputs data.

25. An apparatus according to claim 22, wherein said second communication control apparatus outputs the data received to said driving unit of said image forming apparatus.

26. An apparatus according to claim 22, wherein said second communication control apparatus has third data transmission means for outputting data input from a sensor unit of said image forming apparatus to said data signal line in synchronism with the clock output from said first data transmission means to said clock signal line.

27. An apparatus according to claim 22, wherein said second communication control apparatus comprises a plurality of second communication control apparatuses, and said plurality of second communication control apparatuses are cascade-connected.

28. An apparatus according to claim 22, wherein said first and second data transmission means perform serial communication via said data signal line.

29. An image forming apparatus which has a second communication control apparatus for outputting data to a driving unit of said image forming apparatus, and a first communication control apparatus for communicating with said second communication control apparatus via a clock signal line and a data signal line, comprising:

first data transmission means, provided to said first communication control apparatus, for outputting a clock to said clock signal line and simultaneously outputting predetermined data to said data signal line, and then outputting a data string to be transmitted;

data reception means, provided to said second communication control apparatus, for receiving the clock from said clock signal line and simultaneously receiving the predetermined data from said data signal line, and accordingly starting to receive the data string; and second data transmission means, provided to said first communication control apparatus, for outputting the clock to said clock signal line independently of whether a communication abnormality is detected, and simultaneously outputting inverted data of the predetermined data to said data signal line to initialize said data reception means, wherein said second data transmission means outputs the clock and the inverted data when said first data transmission means does not output data.

30. An apparatus according to claim 29, wherein said second data transmission means outputs clocks at least corresponding to the data string to said clock signal line and simultaneously outputs the inverted data of the predetermined data at least corresponding to the data string to said data signal line.

31. An apparatus according to claim 29, wherein said second data transmission means outputs the clock and the inverted data every time before said first data transmission means outputs data.

32. An apparatus according to claim 29, wherein said second communication control apparatus outputs the data received to said driving unit of said image forming apparatus.

33. An apparatus according to claim 29, wherein said second communication control apparatus has third data transmission means for outputting data input from a sensor unit of said image forming apparatus to said data signal line in synchronism with the clock output from said first data transmission means to said clock signal line.

34. An apparatus according to claim 29, wherein said second communication control apparatus comprises a plurality of second communication control apparatuses, and said plurality of second communication control apparatuses are cascade-connected.

35. An apparatus according to claim 29, wherein said first and second data transmission means perform serial communication via said data signal line.

36. An image forming apparatus which as a second communication control apparatus for outputting data to a driving unit of said image forming apparatus, and a first communication control apparatus for communicating with said second communication control apparatus via a clock signal line and a data signal line, comprising:
 first data transmission means, provided to said first communication control apparatus, for outputting a clock to said clock signal line and simultaneously outputting predetermined data to said data signal line, and then outputting a data string to be transmitted;
 data reception means, provided to said second communication control apparatus, for receiving the clock from said clock signal line and simultaneously receiving the predetermined data from said data signal line, and accordingly starting to receive the data string; and
 second data transmission means, provided to said first communication control apparatus, for outputting the clock to said clock signal line independently of whether a communication abnormality is detected, and simultaneously outputting inverted data of the predetermined data to said data signal line to initialize said data reception means,
 wherein said first communication control apparatus continuously outputs the inverted data to said data signal line when said first and second data transmission means do not output data.

37. An apparatus according to claim 36, wherein said second data transmission means outputs clocks at least corresponding to the data string to said clock signal line and simultaneously outputs the inverted data of the predetermined data at least corresponding to the data string to said data signal line.

38. An apparatus according to claim 36, wherein said second data transmission means outputs the clock and the inverted data every time before said first data transmission means outputs data.

39. An apparatus according to claim 36, wherein said second communication control apparatus outputs the data received to said driving unit of said image forming apparatus.

40. An apparatus according to claim 36, wherein said second communication control apparatus has third data transmission means for outputting data input from a sensor unit of said image forming apparatus to said data signal line in synchronism with the clock output from said first data transmission means to said clock signal line.

41. An apparatus according to claim 36, wherein said second communication control apparatus comprises a plurality of second communication control apparatuses, and said plurality of second communication control apparatuses are cascade-connected.

42. An apparatus according to claim 36, wherein said first and second data transmission means perform serial communication via said data signal line.

43. An image forming apparatus which has a first communication control apparatus for performing communication with a second communication control apparatus, comprising:
 said first communication control apparatus for performing the communication with said second communication control apparatus via a clock signal line and a data signal line, said second communication control apparatus receiving a clock from said clock signal line and simultaneously receiving predetermined data from said data signal line, and accordingly starting to receive a data string;
 first data transmission means, provided to said first communication control apparatus, for outputting the clock to said clock signal line and simultaneously outputting the predetermined data to said data signal line, and then outputting the data string to be transmitted; and
 second data transmission means, provided to said first communication control apparatus, for outputting the clock to said clock signal line independently of whether a communication abnormality is detected, and simultaneously outputting inverted data of the predetermined data to said data signal line to initialize said second communication control apparatus,
 wherein said second data transmission means outputs the clock and the inverted data at a predetermined time interval.

44. An apparatus according to claim 43, wherein said second data transmission means outputs clocks at least corresponding to the data string to said clock signal line and simultaneously outputs the inverted data of the predetermined data at least corresponding to the data string to said data signal line.

45. An apparatus according to claim 43, wherein said second data transmission means outputs the clock and the inverted data every time before said first data transmission means output data.

46. An apparatus according to claim 43, wherein said second communication control apparatus outputs the data received to a driving unit of said image forming apparatus.

47. An apparatus according to claim 43, wherein said second communication control apparatus has third data transmission means for outputting data input from a sensor unit of said image forming apparatus to said data signal line in synchronism with the clock output from said first data transmission means to said clock signal line.

48. An apparatus according to claim 43, wherein said second communication control apparatus comprises a plurality of second communication control apparatuses, and said plurality of second communication control apparatuses are cascade-connected.

49. An apparatus according to claim 43, wherein said first and second data transmission means perform serial communication via said data signal line.

50. An image forming apparatus which has a first communication control apparatus for performing communication with a second communication control apparatus, comprising:
 said first communication control apparatus for performing the communication with said second communication control apparatus via a clock signal line and a data signal line, said second communication control apparatus receiving a clock from said clock signal line and simultaneously receiving predetermined data from said data signal line, and accordingly starting to receive a data string;

first data transmission means, provided to said first communication control apparatus, for outputting the clock to said clock signal line and simultaneously outputting the predetermined data to said data signal line, and then outputting the data string to be transmitted; and second data transmission means, provided to said first communication control apparatus, for outputting the clock to said clock signal line independently of whether a communication abnormality is detected, and simultaneously outputting inverted data of the predetermined data to said data signal line to initialize said second communication control apparatus, wherein said second data transmission means outputs the clock and the inverted data when said first data transmission means does not output data.

51. An apparatus according to claim 50, wherein said second data transmission means outputs clocks at least corresponding to the data string to said clock signal line and simultaneously outputs the inverted data of the predetermined data at least corresponding to the data string to said data signal line.

52. An apparatus according to claim 50, wherein said second data transmission means outputs the clock and the inverted data every time before said first data transmission means outputs data.

53. An apparatus according to claim 50, wherein said second communication control apparatus outputs the data received to a driving unit of said image forming apparatus.

54. An apparatus according to claim 50, wherein said second communication control apparatus has third data transmission means for outputting data input from a sensor unit of said image forming apparatus to said data signal line in synchronism with the clock output from said first data transmission means to said clock signal line.

55. An apparatus according to claim 50, wherein said second communication control apparatus comprises a plurality of second communication control apparatuses, and said plurality of second communication control apparatuses are cascade-connected.

56. An apparatus according to claim 50, wherein said first and second data transmission means perform serial communication via said data signal line.

57. An image forming apparatus which has a first communication control apparatus for performing communication with a second communication control apparatus, comprising:

said first communication control apparatus for performing the communication with said second communication control apparatus via a clock signal line and a data signal line, said second communication control apparatus receiving a clock from said clock signal line and simultaneously receiving predetermined data from said data signal line, and accordingly starting to receive a data string;

first data transmission means, provided to said first communication control apparatus, for outputting the clock to said clock signal line and simultaneously outputting the predetermined data to said data signal line, and then outputting the data string to be transmitted; and second data transmission means, provided to said first communication control apparatus, for outputting the clock to said clock signal line independently of whether a communication abnormality is detected, and simultaneously outputting inverted data of the predetermined data to said data signal line to initialize said second communication control apparatus, wherein said first communication control apparatus continuously outputs the inverted data to said data signal line when said first and second data transmission means do not output data.

58. An apparatus according to claim 57, wherein said second data transmission means outputs clocks at least corresponding to the data string to said clock signal line and simultaneously outputs the inverted data of the predetermined data at least corresponding to the data string to said data signal line.

59. An apparatus according to claim 57, wherein said second data transmission means outputs the clock and the inverted data every time before said first data transmission means outputs data.

60. An apparatus according to claim 57, wherein said second communication control apparatus outputs the data received to a driving unit of said image forming apparatus.

61. An apparatus according to claim 57, wherein said second communication control apparatus has third data transmission means for outputting data input from a sensor unit of said image forming apparatus to said data signal line in synchronism with the clock output from said first data transmission means to said clock signal line.

62. An apparatus according to claim 57, wherein said second communication control apparatus comprises a plurality of second communication control apparatuses, and said plurality of second communication control apparatuses are cascade-connected.

63. An apparatus according to claim 57, wherein said first and second data transmission means perform serial communication via said data signal line.

64. A method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputting inverted data of the predetermined data to the data signal line to initialize the second communication control apparatus, wherein the second data transmission means outputs the clock and the inverted data at a predetermined time interval.

65. A method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputting inverted data of the predetermined data to the data signal line to initialize the second communication control apparatus, wherein the second data transmission means outputs the clock and the inverted data when the first data transmission means does not output data.

66. A method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputting inverted data of the predetermined data to the data signal line to initialize the second communication control apparatus, wherein the first communication control apparatus continuously outputs the inverted data to the data signal line when the first and second data transmission means do not output data.

67. A method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the second data transmission means outputs the clock and the inverted data at a predetermined time interval.

68. A method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the second data transmission means outputs the clock and the inverted data when the first data transmission means does not output data.

69. A method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the first communication control apparatus continuously outputs the inverted data to the data signal line when the first and second data transmission means do not output data.

70. A computer-readable storage medium storing computer-executable program code for operating a computer system, which when run, executes a method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputted inverted data of the predetermined data to the data signal line to initialize the second communication control apparatus, wherein the second data transmission means outputs the clock and the inverted data at a predetermined time interval.

71. A computer-readable storage medium storing computer-executable program code for operating a computer system, which then run, executes a method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputting inverted data of the predetermined data to the data signal line to initialize the second communication control apparatus, wherein the second data transmission means outputs the clock and the inverted data when the first data transmission means does not output data.

72. A computer-readable storage medium storing computer-executable program code for operating a computer system, which when run, executes a method for communicating in an image forming apparatus which has a first communication control apparatus for controlling a driving unit of the image forming apparatus via a second communication control apparatus, the first communication control apparatus being provided with first and second data transmission means, wherein said method of communicating is performed between the first communication control apparatus and the second communication control signal apparatus via a clock signal line and a data signal line, the second communication control apparatus receiving a clock from the clock signal line and simultaneously receiving predetermined data from the data signal line, and accordingly starting to receive a data string, said method comprising the steps of:

outputting from the first data transmission means the clock to the clock signal line and simultaneously outputting the predetermined data to the data signal line, and then outputting the data string to be transmitted; and outputting from second data transmission means the clock to the clock signal line independently of whether a communication abnormality is detected, and simultaneously outputting inverted data of the predetermined data to the data signal line to initialize the second communication control apparatus, wherein the first communication control apparatus continuously outputs the inverted data to the data signal line when the first and second data transmission means do not output data.

73. A computer-readable storage medium storing computer-executable program code for operating a computer system, which when run, executes a method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the second data transmission means outputs the clock and the inverted data at a predetermined time interval.

74. A computer-readable storage medium storing computer-executable program code for operating a computer system, which when run, executes a method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the second data transmission means outputs the clock and the inverted data when the first data transmission means does not output data.

75. A computer-readable storage medium storing computer-executable program code for operating a computer system, which when run, executes a method of communication in an image forming apparatus which has a second communication control apparatus for outputting data to a driving unit of the image forming apparatus, the second communication control apparatus provided with data reception means, and a first communication control apparatus for communicating with the second communication control apparatus via a clock signal line and a data signal line, the first communication control apparatus provided with first and second data communication means, said method comprising the steps of:

outputting from the first data transmission means a clock to the clock signal line and simultaneously outputting predetermined data to the data signal line, and then outputting a data string to be transmitted;

receiving by the data reception means the clock from the clock signal line and simultaneously receiving the predetermined data from the data signal line, and accordingly starting to receive the data string; and outputting from the second data transmission means the clock to the clock signal line independently of whether a communication abnormality is detected, and simultaneously outputting inverted data of the predetermined data to the data signal line to initialize the data reception means, wherein the first communication control apparatus continuously outputs the inverted data to the data signal line when the first and second data transmission means do not output data.

* * * * *

UNITED STATES PATENT AND TRADEMARK OFFICE
CERTIFICATE OF CORRECTION

PATENT NO. : 6,349,389 B1
DATED : February 19, 2002
INVENTOR(S) : Toshiyuki Sekiya et al.

It is certified that error appears in the above-identified patent and that said Letters Patent is hereby corrected as shown below:

Column 1,
Line 17, "solenoid" should read -- solenoid, --.

Column 2,
Line 23, "low" should read -- (low) --;
Line 29, "high." should read -- (high). --.

Column 3,
Line 10, "and" should read -- to --.

Column 4,
Line 65, "line 9" should read -- line 9, a --.
Line 66, "of," should read -- of --.

Column 5,
Line 6, "ended when" should read -- ended. When --;
Line 11, "deck" should read -- dock --;
Line 37, "Load" (both occurrences) should read -- load --.

Column 6,
Line 46, "far" should read -- long --;
Line 63, "the storage medium also, may store at least" should read -- subject. The storage medium also may store --.

Column 7,
Line 5, "of" (first occurrence) should read -- or --;
Line 46, "output" should read -- outputs --;
Line 50, "claim 1" should read -- claim 1, --.

Column 8,
Line 4, "combination" should read -- communication --;
Line 18, "outputted" should read -- outputting --;
Line 60, "check" should read -- clock --.

Column 9,
Line 22, "output" should read -- outputs --.

Column 11,
Line 14, "as" should read -- has --.

UNITED STATES PATENT AND TRADEMARK OFFICE
CERTIFICATE OF CORRECTION

PATENT NO.     : 6,349,389 B1
DATED          : February 19, 2002
INVENTOR(S)    : Toshiyuki Sekiya et al.

It is certified that error appears in the above-identified patent and that said Letters Patent is hereby corrected as shown below:

Column 12,
Line 37, "output" shoud read -- outputs --.

Column 14,
Line 50, "from" should read -- from the --.

Column 15,
Lines 11 and 39, "from" should read -- from the --;
Line 57, "communica-" should read -- transmission --;
Line 58, "tion" should be deleted.

Column 16,
Line 18, "communica-" should read -- transmission --;
Line 19, "tion" should be deleted.

Column 17,
Lines 20 and 50, "from" should read -- from the --;
Line 23, "outputted" should read -- outputting --;
Line 31, "then" should read -- when --.

Column 18,
Line 3, "signal" should be deleted;
Lines 35 and 66, "communication" should read -- transmission --.

Column 20,
Line 4, "communication" should read -- transmission --.

Signed and Sealed this

Eighth Day of April, 2003

JAMES E. ROGAN
*Director of the United States Patent and Trademark Office*